United States Patent
Takaishi

(10) Patent No.: US 7,605,998 B2
(45) Date of Patent: Oct. 20, 2009

(54) SETTLING JUDGMENT METHOD FOR POSITIONING CONTROL DEVICE, POSITIONING CONTROL DEVICE AND DISK APPARATUS

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 592 days.

(21) Appl. No.: 11/455,478

(22) Filed: Jun. 19, 2006

(65) Prior Publication Data

US 2007/0230305 A1    Oct. 4, 2007

(30) Foreign Application Priority Data

Mar. 30, 2006   (JP)   ............... 2006-093398

(51) Int. Cl.
*G11B 5/55*   (2006.01)
(52) U.S. Cl. ............... 360/78.04; 369/53.39; 369/30.01
(58) Field of Classification Search ........ 360/75–78.14; 369/53.29, 53.39, 30.01, 44.34, 44.25, 44.28
See application file for complete search history.

(56) References Cited

U.S. PATENT DOCUMENTS 5,307,330 A    4/1994   Okamura 6,560,059 B1    5/2003   Hsin
2003/0055855 A1    3/2003   Wiener
2004/0179290 A1    9/2004   Hiroshi

FOREIGN PATENT DOCUMENTS

JP    04-298868    10/1992
JP    08-106742    4/1996

*Primary Examiner*—Thang V Tran
(74) *Attorney, Agent, or Firm*—Greer, Burns & Crain, Ltd.

(57) ABSTRACT

A settling judgment method judges whether an object is settled at a target position by using a settlement judgment formula set a slice value and number of continuous samples. The slice and number of continuous judgments of the judgment value of the settling judgment are judged by the slice value and number of samples which are set such that the maximum value of a maximum amplitude ratio (Rate), for each frequency of cyclic disturbance (Y), determined from the maximum amplitude values (Max1, Max2) of the judgment values when the cyclic disturbance is applied is contained within a predetermined position accuracy. Settlings can be judged at high-speed and accurately according to the settling judgment formula, and both an improvement of positioning accuracy and high-speed judgment can be implemented.

20 Claims, 11 Drawing Sheets

Servo Mark
Gray Code
Index
PosA PosB PosC PosD

FIG. 9

| FREQUENCY F | MAXIMUM RATE Rate(Max) |
|---|---|
| $f_1$ | |
| $f_2$ | |
| ⋮ | |
| $f_n (=F_s/2)$ | |

| JUDGMENT FORMULA | NUMBER OF SAMPLES | SLICE (ABSOLUTE VALUE) |
|---|---|---|
| $y[n]$ | 3 | 0.075 |
| | 5 | 0.10 |
| $2 \cdot y[n] - y[n-1]$ | 3 | 0.15 |
| | 5 | 0.15 |

TOLERANCE TRACK WIDTH = ±0.15

| JUDGMENT FORMULA | NUMBER OF SAMPLES | W SLICE (TOLERANCE = ±0.15) | R SLICE (TOLERANCE = ±0.30) |
|---|---|---|---|
| y[n] | 3 | 0.075 | 0.150 |
| y[n] | 5 | 0.10 | 0.20 |
| 2·y[n]−y[n−1] | 3 | 0.15 | 0.30 |
| 2·y[n]−y[n−1] | 5 | 0.15 | 0.30 |

SETTLING JUDGMENT METHOD FOR POSITIONING CONTROL DEVICE, POSITIONING CONTROL DEVICE AND DISK APPARATUS

CROSS-REFERENCE TO RELATED APPLICATIONS

This application is based upon and claims the benefit of priority from the prior Japanese Patent Application No. 2006-093398, filed on Mar. 30, 2006, the entire contents of which are incorporated herein by reference.

BACKGROUND OF THE INVENTION

1. Field of the Invention

The present invention relates to a settlement judgment method for judging whether an object is settled at a target position, or is following up in a positioning control device for moving the object to the target position by an actuator, and to the positioning control device and the disk apparatus, and more particularly to a settling judgment method for a positioning control device for decreasing the settling judgment time and accurately judging the settling, and to the positioning control device and the disk apparatus.

2. Description of the Related Art

A positioning control device for moving an object to a target position is widely used. For this positioning control device, high precision positioning is demanded when used for a disk device, for example. Particularly in a magnetic disk device or an optical disk device, accurately positioning a head to a target track is extremely important to improve recording density. Settling judgment is a method for judging whether the positioning control to this target position is being performed accurately.

In the settling judgment of a positioning control device, it is required to satisfy the predetermined positioning conditions during a predetermined time after moving or after the position deviates. For example, in the case of a magnetic disk device, settling judgment is performed after seek control and during follow up control. In this settling judgment, the completion of settling is judged when the value of the judgment formula based on the positional error continuously satisfies a predetermined slice range for more than a predetermined number of times (number of samples).

As the method for judging settling, a method of predicting the position of the next sample (for example, Japanese Patent Application Laid-Open No. H08-106742), and a method of using an estimated position using an observer (for example, Japanese Patent Application Laid-Open No. H04-298868) have been proposed.

With such prior art, the conditions of settling judgment, particularly the value of slice and the number of samples, are determined based on experience. For example, in order to accurately judge settling, it is preferable to set the value of slice high and also the number of samples high.

In the disk device, for example, the width of the data track is predetermined and the data tracks are arranged next to each other in the radius direction. Therefore if the head moves to an adjacent track after seeking or after settlement judgment during follow up, the data may be erased by error. Or a part of the data may be erased and the S/N of the recorded data drops.

In order to improve the response performance in the seek control of the disk device or recovery control during follow up control, the settling judgment time should be decreased. But if this judgment time is too short, residual vibration after seeking may not be detected, and positioning accuracy may drop after settling completes.

Because of the recent demand for large capacities and higher speeds in disk devices, settling judgment conditions are critical for safety and for the high-speed processing of data, but with the prior art, implementing both a short settling judgment time and good positioning accuracy is difficult.

SUMMARY OF THE INVENTION

With the foregoing in view, it is an object of the present invention to provide a settling judgment method of a positioning control device, a positioning control device and a disk apparatus for judging settling accurately and at high-speed.

It is an another object of the present invention to provide a settling judgment method for a positioning control device, a positioning control device and a disk apparatus for setting a slice value and a number of samples according to a settling judgment formula and judging settling accurately at high speed according to the settling judgment formula.

It is still another object of the present invention to provide a settling judgment method for a positioning control device, a positioning control device and a disk apparatus for improving the response performance of moving time and improving the positioning accuracy.

To achieve these objects, a settling judgment method of the present invention is a settling judgment method for judging the settling of an object at a target position of a positioning control device for performing position control, according to a position error between a target position and a current position, having: a step of calculating a judgment value from the position error using a predetermined judgment formula; a judgment value judgment step of judging whether the judgment value is less than a slice value, which is set such that a maximum value of maximum amplitude ratios, which determined from the maximum amplitude value of the judgment value when the cyclic disturbance is applied to the position control device, for each frequency of a cyclic disturbance, is contained within a predetermined positioning accuracy; and a period judgment step of judging whether continuous samples, of which the judgment value is less than the slice value, continue for a number of samples which is set such that the maximum value of the maximum amplitude ratios is contained within a predetermined positioning accuracy.

A positioning control device of the present invention has a positioning control block for performing position control of an object according to a position error between a target position and a current position, and a settling judgment block for calculating a judgment value from the position error using a predetermined judgment formula and for judging whether continuous samples of which the judgment value is less than a slice value continue for a predetermined number of samples to judge settlement. The settlement judgment block uses the slice which is set such that a maximum value of maximum amplitude ratios for each frequency of a cyclic disturbance, which are determined from the maximum amplitude value of the judgment value when a cyclic disturbance for each frequency is applied to the position control block, is contained within a predetermined positioning accuracy, and uses the predetermined number of samples which is set such that the maximum value of the maximum amplitude ratios is contained within a predetermined positioning accuracy.

A disk apparatus of the present invention has a head for at least reading data on a disk; an actuator for moving the head over the disk; a positioning control block for performing position control of the head according to a position error between a target position and a current position, and a settling judgment block for calculating a judgment value from the position error using a predetermined judgment formula and for judging whether continuous samples of which the judgment value is less than a slice value continue for a predetermined number of samples to judge settlement. The settlement judgment block uses the slice which is set such that a maximum value of maximum amplitude ratios for each frequency of a cyclic disturbance, which are determined from the maximum amplitude value of the judgment value when a cyclic disturbance for each frequency is applied to the position control block, is contained within a predetermined positioning accuracy, and uses the predetermined number of samples which is set such that the maximum value of the maximum amplitude ratios is contained within a predetermined positioning accuracy.

In the present invention, it is preferable that the judgment value judgment step further has a step of judging whether the judgment value is less than the slice value which is set such that the maximum value of the maximum amplitude ratios, for each cyclic disturbance, determined from the maximum amplitude value of the judgment value when a sine wave is applied as a cyclic disturbance is contained within a predetermined positioning accuracy.

Also in the present invention, it is preferable that the judgment value judgment step further has a step of judging whether the judgment value is less than a slice value, which is determined from a maximum value of a maximum ratios at a plurality of frequencies and a tolerance width of the positioning accuracy. The maximum ratios are determined between a maximum value of the judgment value of the position error in a settling judgment period and a maximum value of the position error after the judgment period to the next sample at a plurality of frequencies while changing the phase and frequency of a sine wave as a position error.

Also in the present invention, it is preferable that the period judgment step further has a step of judging settling by continuation of the number of samples which is determined by the judgment period in which the judgment value is less than the slice value.

Also in the present invention, it is preferable that the judgment value judgment step further has a step of judging whether the judgment value is less than one slice value selected from a slice value of each judgment formula, which is determined from a maximum value of a maximum amplitude ratio for each cyclic disturbance determined from the maximum amplitude value of the judgment value of a plurality of judgment formulas when the cyclic disturbance is applied, and the period judgment step further has a step of judging whether the continuous samples, of which the judgment value is less than the slice value, continue for one of the numbers of samples selected from the numbers of samples of each of the plurality of judgment formulas determined such that the maximum value of the maximum amplitude ratio in the plurality of judgment formulas is contained within a predetermined positioning accuracy.

Also in the present invention, it is preferable that the period judgment step further has a step of judging whether the position of a head is settled at a target position of a disk.

Also in the present invention, it is preferable that the judgment value judgment step further has a step of judging whether the judgment value is less than a write slice value, which is set such that the maximum value of the maximum amplitude ratio for each frequency of the cyclic disturbance, determined from the maximum amplitude value of the judgment value when a cyclic disturbance is applied, is contained within a predetermined write positioning accuracy of the head, or less than a read slice value, which is set such that the maximum value is contained within a predetermined read positioning accuracy of the head.

Also in the present invention, it is preferable that the positioning control block positions a head, as the object, at a target position of a disk.

Also in the present invention, it is preferable that the settling judgment block judges whether the head is settled within a positioning accuracy range of the target position.

Also in the present invention, it is preferable that the settling judgment block judges whether the judgment value is less than a write slice value, which is set such that the maximum value of the maximum amplitude ratio for each frequency of cyclic disturbance, determined from the maximum amplitude value of the judgment value when a cyclic disturbance is applied, is contained within a predetermined write positioning accuracy of the head, or less than a read slice value, which is set such that the maximum value is contained within a predetermined read positioning accuracy of the head.

Also in the present invention, it is preferable that the settling judgment block selects either one of the write slice value and read slice value depending on read operation or write operation of the head in the disk.

Also in the present invention, it is preferable that the settling judgment block judges whether the head is settled at the target position during seek control of the head.

Also in the present invention, it is preferable that the settling judgment block judges whether the head is following up to the target position.

In the present invention, the judgment value of the settling judgment and number of continuous samples are judged by the slice value and number of samples which are set such that the maximum value of a maximum amplitude ratio for each frequency of cyclic disturbance, determined from the maximum amplitude values of the judgment values when the cyclic disturbance is applied, is contained within a predetermined positioning accuracy. Therefore, settling can be judged at high-speed and accurately according to the settling judgment formula, and both an improvement of the positioning accuracy and high-speed judgment can be implemented.

BRIEF DESCRIPTION OF THE DRAWINGS

FIG. 9 is a table of the maximum ratio for each frequency in FIG. 6 to FIG. 8;

DESCRIPTION OF THE PREFERRED EMBODIMENTS

Embodiments of the present invention will now be described in the sequence of configuration of the disk device, setting of settling judgment conditions, other positioning control devices and other embodiments, but the present invention is not limited to these embodiments.

Configuration of Disk Device

Figure 1:
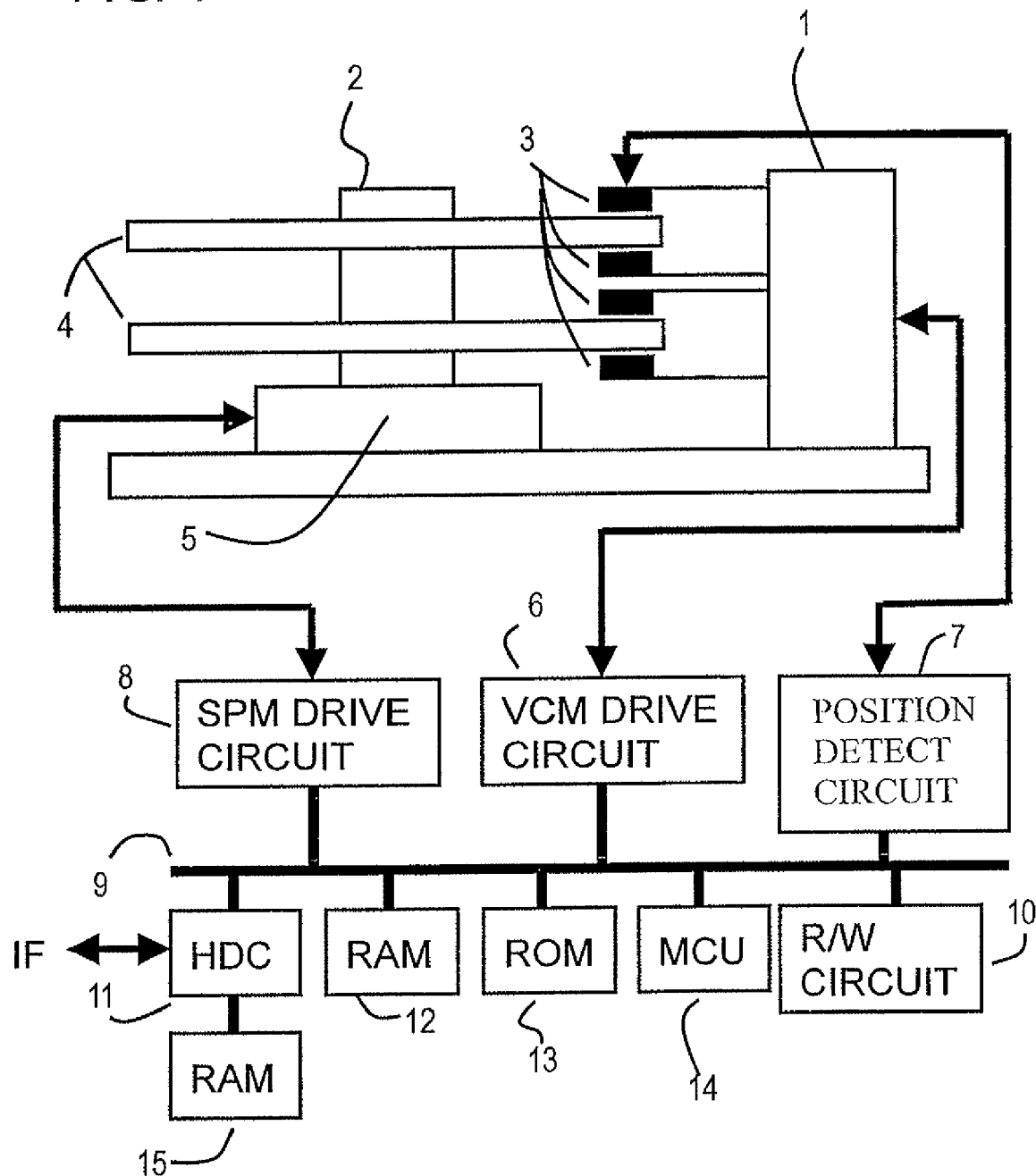
FIG. 1 is a block diagram depicting a positioning control device according to an embodiment of the present invention.
Figure 2:
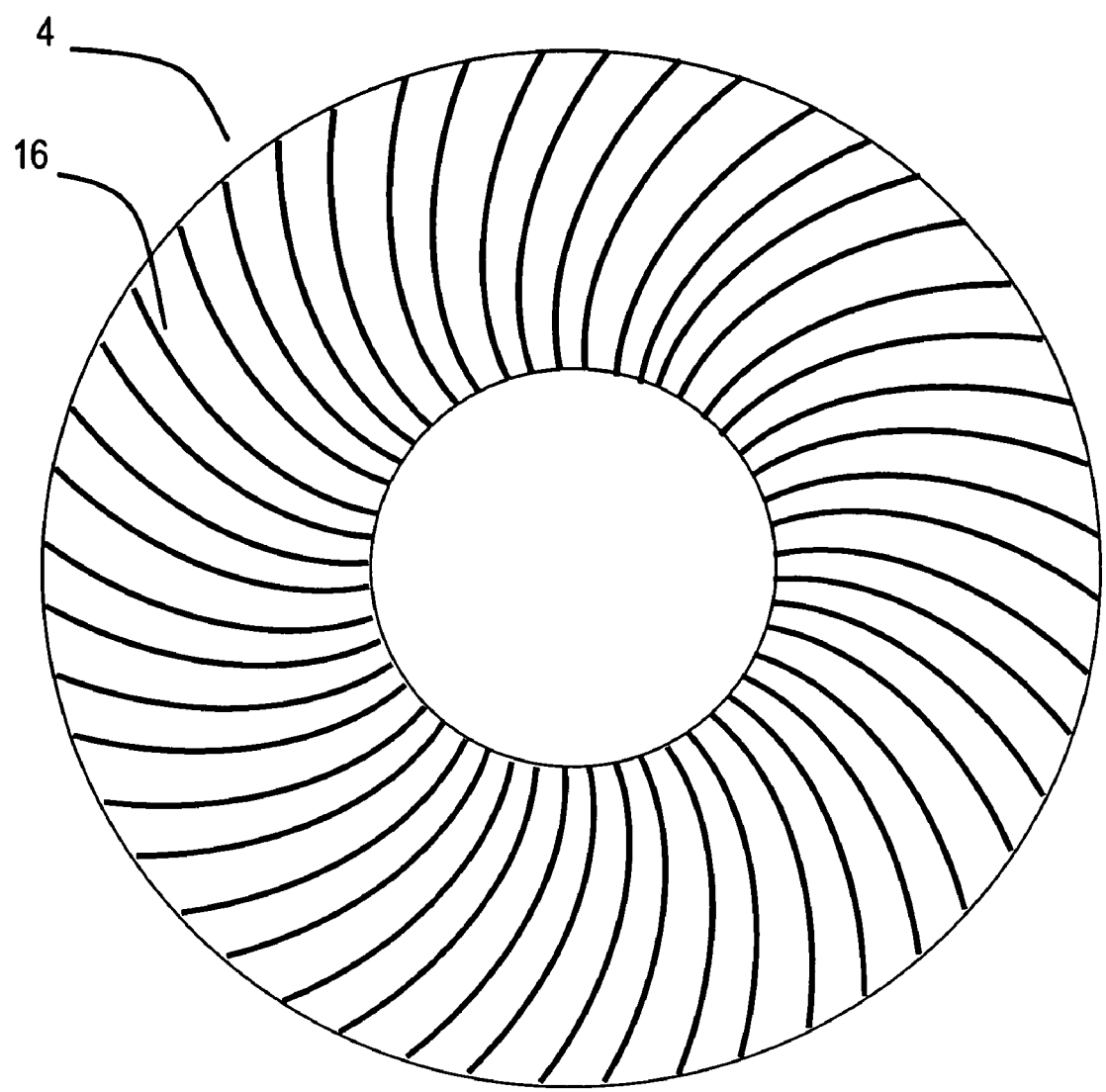
FIG. 2 is a diagram depicting the structure of the magnetic recording medium in FIG. 1.
Figure 3:
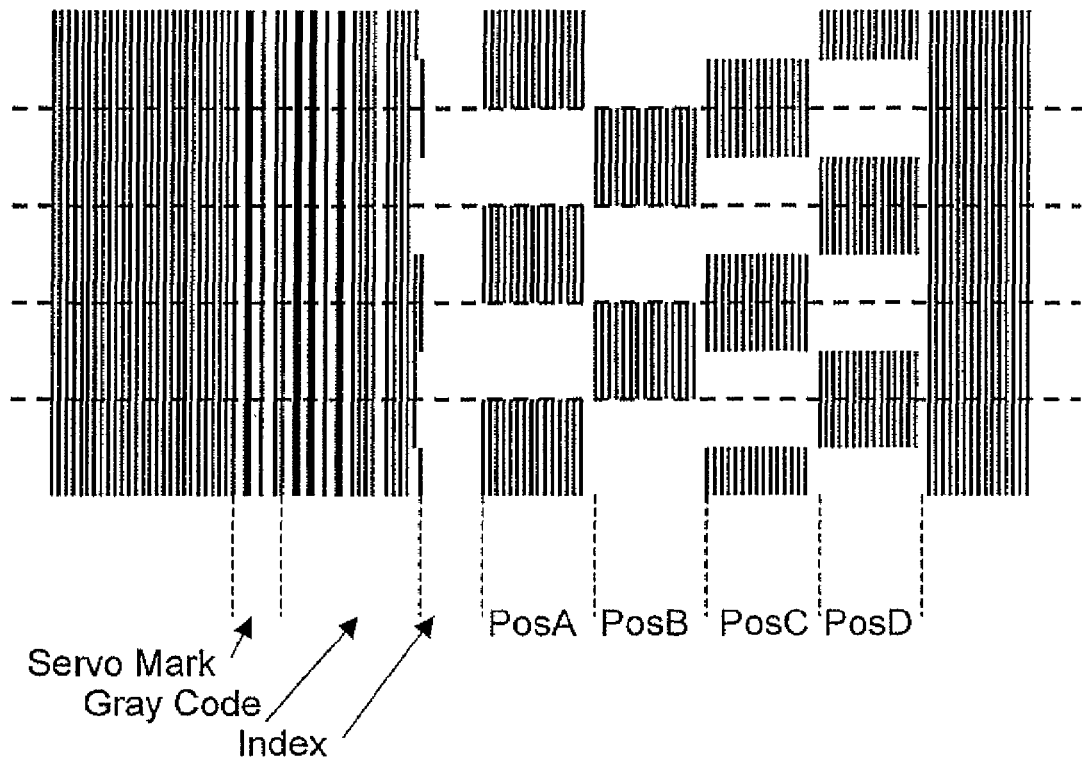
FIG. 3 is a diagram depicting the servo area in FIG. 2.
Figure 4:
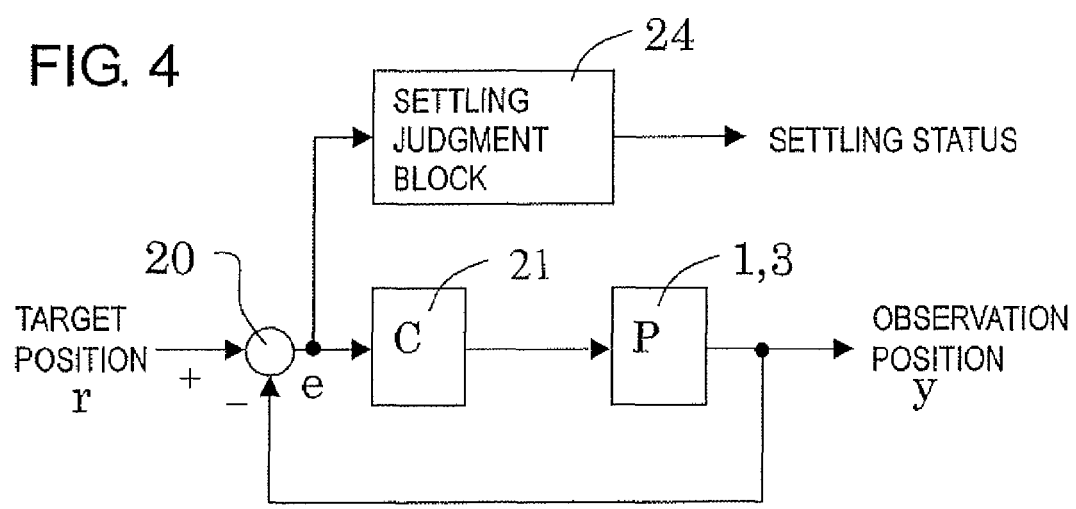
FIG. 4 is a block diagram depicting the positioning control system in FIG. 1.
Figure 5:
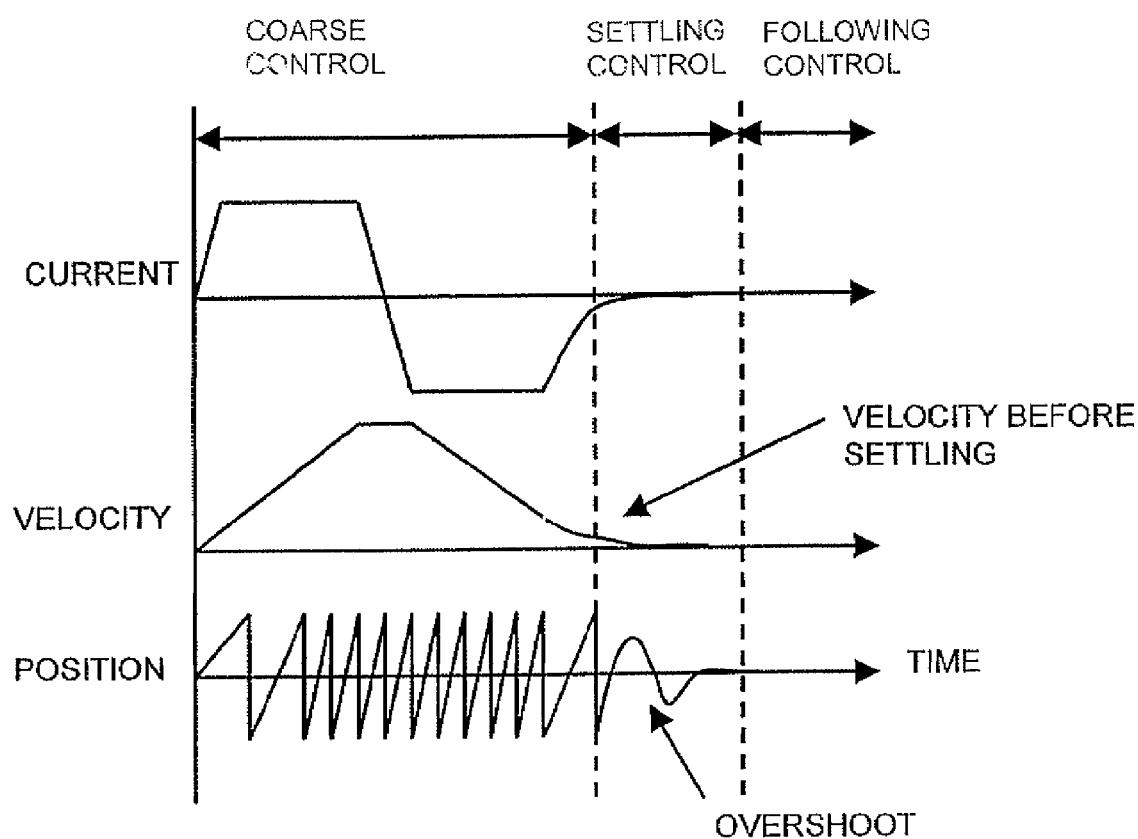
FIG. 5 is a transition diagram depicting the head movement control in FIG. 1 and FIG. 4.

FIG. 1 is a block diagram depicting the disk device according to an embodiment of the present invention, FIG. 2 is a diagram depicting an arrangement of the position signals and tracks of the magnetic disk in FIG. 1, FIG. 3 is a diagram depicting the configuration of the position signals of the magnetic disk in FIG. 1 and FIG. 2, FIG. 4 is a block diagram depicting the head position control system in FIG. 1, and FIG. 5 is a diagram depicting the head position control in FIG. 1 and FIG. 4.

FIG. 1 shows a magnetic disk device as an example of the disk device. As FIG. 1 shows, a magnetic disk 4, which is a magnetic storage medium, is installed at a rotation axis 2 of a spindle motor 5. The spindle motor 5 rotates the magnetic disk 4. An actuator (VCM) 1 has a magnetic head 3, and moves the magnetic head 3 in the radius direction of the magnetic disk 4 by rotating.

The actuator 1 is comprised of a voice coil motor (VCM) which rotates with the rotation axis as the center. In FIG. 1, two magnetic disks 4 are mounted on the magnetic disk device, and four magnetic heads 3 are simultaneously driven by the same actuator 1. This configuration is the same even if there is one magnetic disk 4 and two magnetic heads.

The magnetic head 3 is a separate type head which has read elements and write elements. The magnetic head 3 is comprised of read elements, including magneto-resistance (MR) elements, laminated on the slider, and write elements, including the write coil stacked thereon.

A position detection circuit 7 converts the position signals (analog signals) read by the magnetic head 3 into digital signals. A read/write (R/W) circuit 10 controls the read and write of the magnetic head 3. A spindle motor (SPM) drive circuit 8 drives the spindle motor 5. A voice coil motor (VCM) drive circuit 6 supplies the drive current to the voice coil motor (VCM) 1 and drives the VCM 1.

A micro-controller (MCU) 14 detects (demodulates) the current position from the digital position signals from the position detection circuit 7, and calculates the VCM drive instruction value according to the error between the detected current position and the target position. In other words, the micro-controller 14 demodulates the position and performs servo control (position control). A read only memory (ROM) 13 stores the control program of the MCU 14. A random access memory (RAM) 12 stores the data for processing of the MCU 14.

A hard disk controller (HDC) 11 judges a position in one track based on the sector number of the servo signal, and records/regenerates the data. A random access memory (RAM) for the buffer 15 temporarily stores the read data or write data. The HDC 11 communicates with a host via an interface IF, such as USB, ATA or SCSI. A bus 9 connects these composing elements.

As FIG. 2 shows, the magnetic disk 4 has servo areas 16 which are arranged in a sector of each track in the circumference direction from the outer circumference to the inner circumference, where servo information is recorded. The solid lines in FIG. 2 indicate a position where the servo information is recorded.

As FIG. 3 shows, in the servo area 16, the position signals (servo information) are recorded by magnetic recording or by such mechanical patterns as pits. This position signal is comprised of a servo mark ServoMark, track number GrayCode, index Index and offset information (servo burst) PosA, PosB, PosC and PosD. The dotted line in FIG. 3 shows the track center of the servo.

The position signals in FIG. 3 are read by the read element of the head 3, and the position of the magnetic head in the radius direction is detected using the track number GrayCode and offset information PosA, PosB, PosC and PosD. Also the position of the magnetic head in the circumference direction is acquired based on the index signal Index.

For example, the sector number when the index signal is determined is set to No. 0, which is counted up every time the servo signal is detected, so as to acquire the sector number of each sector of the track. The sector number of the servo signal is used as a reference when data is recorded/regenerated. There is one index signal in one track. The sector number may be set instead of the index signal.

FIG. 4 is a block diagram depicting the operation of the servo control system executed by the MCU 14. As FIG. 4 shows, the servo control system computes the position error 'e' between the target position 'r' and the current position 'y' by the computing block 20, and calculates the control amount Un by the control block (Cn) 21, and drives the VCMs including actuator 1 and head 3, which is the plant. The current position 'y' of the plant is calculated by demodulating the servo signals from the magnetic head 3, and feeding back to the computing block 20.

A settling judgment block 24 judges settling by the position error 'e' using the settling judgment formula and settling judgment conditions (slice value, number of samples). For the settling judgment formula either the position error e ($=Y[n]$) itself is used or a velocity ($2 \cdot Y[n] - Y[n-1]$) is used.

FIG. 5 is an example of the seek control of the actuator executed by the MCU 14 in FIG. 1 and FIG. 4. The MCU 14 confirms the position of the actuator through the position detection circuit 7 in FIG. 1, performs servo computation, and supplies appropriate current to the VCM or actuator 1. FIG. 5 shows the transition of the control from the start of seeking when the head 3 is moved from a certain track position to the target track position, current of the actuator 1, velocity of the actuator (head), and position of the actuator (head).

In other words, in seek control, the head is moved to the target position through the transition from coarse control, settling control and following control (follow up control). Coarse control is basically a velocity control, and settling control and following control are basically position controls for both of which the current position of the head 3 must be detected. In this settling control, settling judgment is performed and read or write is enabled. In the following control as well, settling judgment is performed if recovery to the track center is controlled when an off track occurs.

To confirm the position like this, the servo signals are recorded on the magnetic disk in advance, as mentioned in FIG. 2 and FIG. 3. In other words, as FIG. 3 shows, on the magnetic disk, servo marks which indicate the start position of the servo signal, gray code which indicates the track number, index signal and signals PosA-PosD which indicate offset are recorded in advance. These signals are read by the magnetic head 3, and these servo signals are converted into digital values by the position detection circuit 7.

Setting of Settling Judgment Conditions

Figure 6:
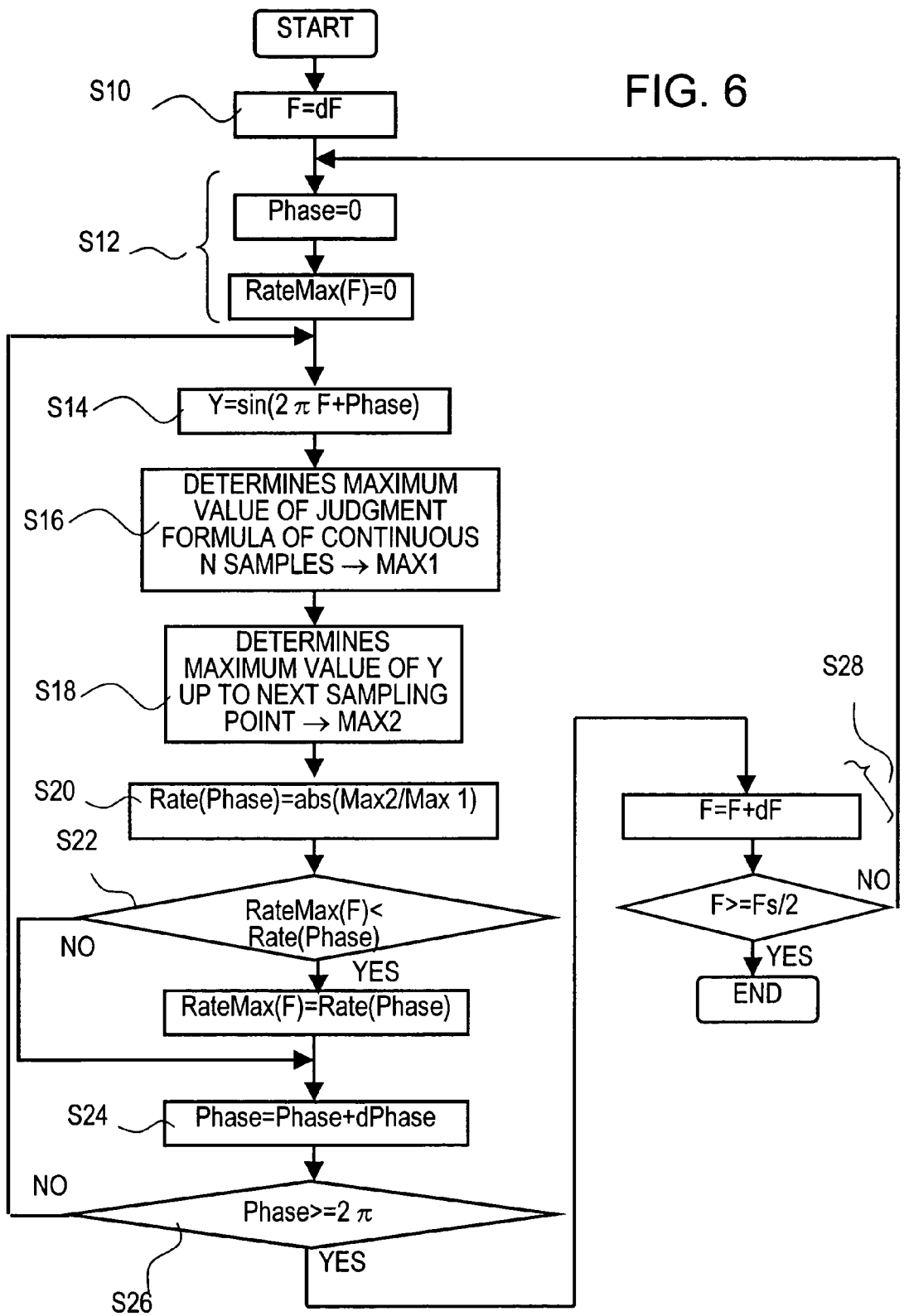
FIG. 6 is a flow chart depicting the maximum ratio calculation processing for each frequency by settling judgment according to an embodiment of the present invention.
Figure 7:
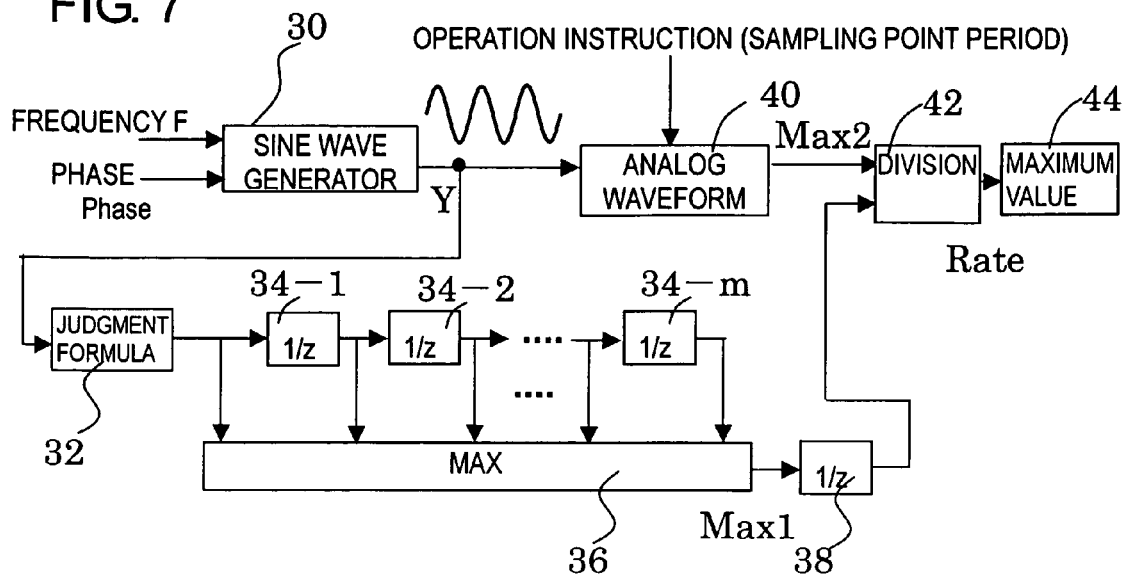
FIG. 7 is a block diagram depicting the maximum ratio calculation processing for each frequency in FIG. 6.
Figure 8:
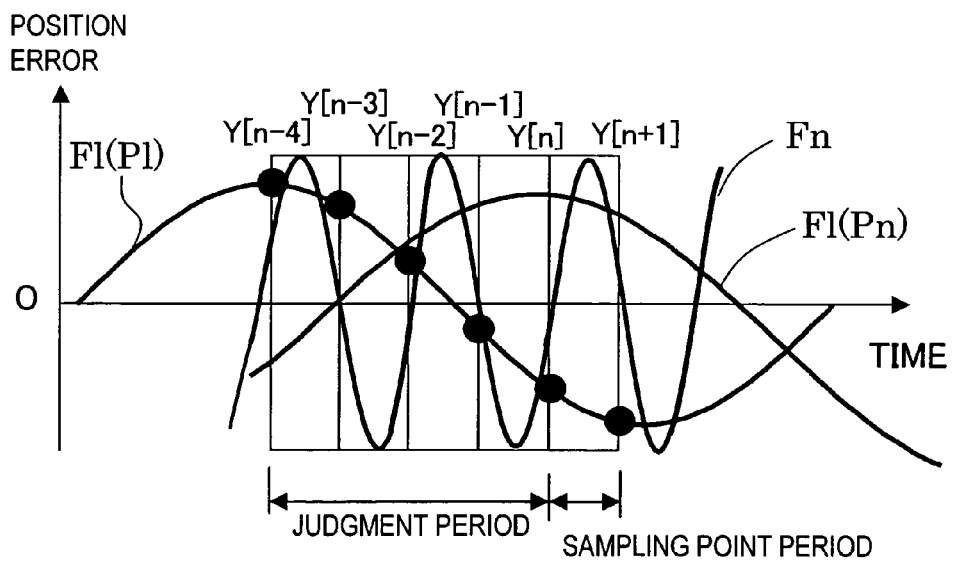
FIG. 8 is a diagram depicting the maximum ratio calculation processing for each frequency in FIG. 6 and FIG. 7.
Figure 12:
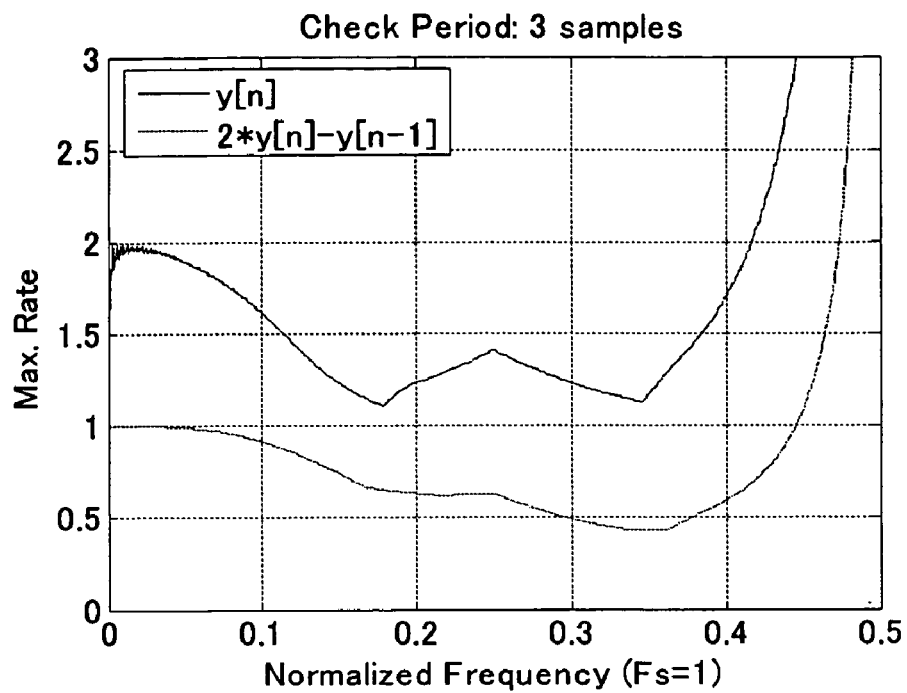
FIG. 12 is a diagram depicting the relationship of the frequency and maximum ratio including the maximum value in the sample period in FIG. 10.
Figure 13:
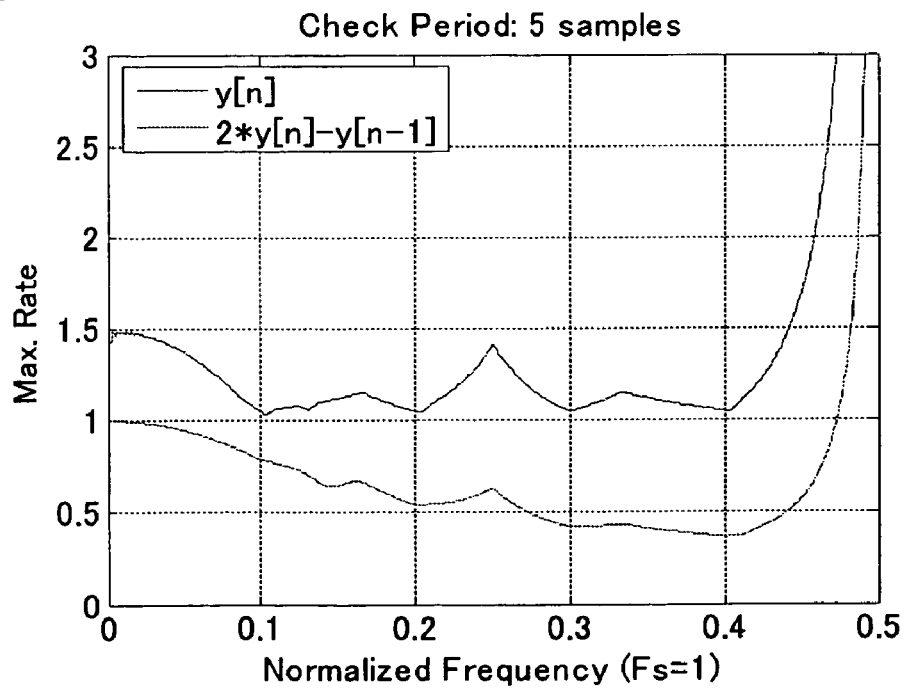
FIG. 13 is a diagram depicting the relationship of the frequency and maximum ratio including the maximum value in the sample period in FIG. 11.
Figures 14, 15:
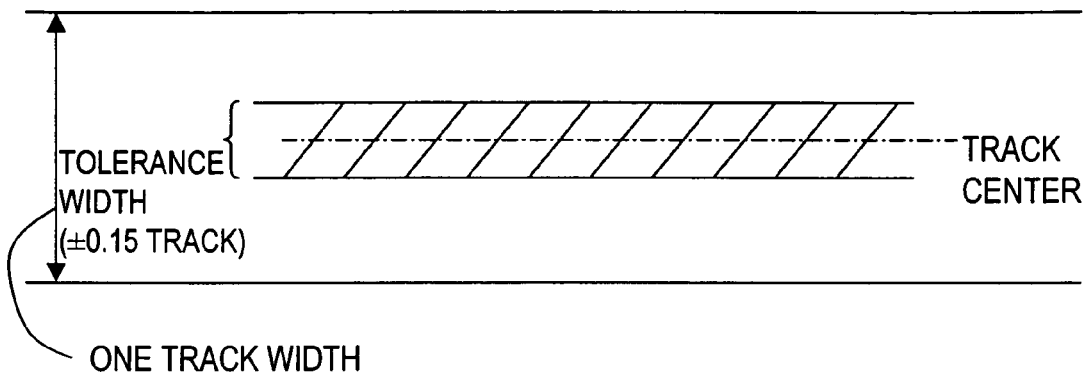
FIG. 14 is a diagram depicting the positioning accuracy for slice value calculation.
FIG. 15 is a table of the slice values when the positioning accuracy in FIG. 14 is used.

FIG. 6 is a flow chart depicting the measuring processing of the settling judgment conditions of the present invention, FIG. 7 is a block diagram depicting the measurement processing in FIG. 6, FIG. 8 is a diagram depicting the measurement processing in FIG. 6 and FIG. 7, FIG. 9 is a table of the measurement processing result in FIG. 6 to FIG. 8, FIG. 10 to FIG. 13 are characteristic diagrams of the frequency vs. maximum value at each number of samples based on the measurement in FIG. 6, FIG. 14 is a diagram depicting the tolerance range for deciding the settling judgment conditions, and FIG. 15 is a table of settling judgment conditions which are set with the tolerance range in FIG. 14.

First an overview of the measurement processing will be described with reference to FIG. 7 to FIG. 8. In the measurement processing, the object (head in the case of FIG. 1) forms a locus which oscillates with respect to the target position, and comes to the target position during positioning, so the position error is indicated by a sine wave. And by changing the phase of this sine wave, the magnification of the maximum amplitude of a sample or samples after the settling judgment is completed with respect to the value of the settling judgment formula is determined, and the maximum value of the magnification is determined. Since the frequency of the position error changes depending on the seek distance, the maximum value is determined with various frequencies.

The above will be described specifically. As FIG. 7 shows, the frequency F and the phase Phase are instructed to the sine wave generation block 30, and sine wave Y with the specified frequency F and phase Phase is generated from the sine wave generation block 30. This sine wave Y is input to the judgment formula block 32, which calculates the judgment value by the judgment formula at a predetermined sampling period. The judgment formula is, for example, value at each sample itself, or $(2 \cdot Y[n] - Y[n-1])$ where the value $Y[n]$ of the current sample and the value $Y[n-1]$ of the previous sample are used.

The value of the judgment formula is sequentially delayed in the delay blocks 34-1 to 34-$m$, and the input and output of the delay blocks are input to the maximum value judgment block 36 and the maximum value Max1 thereof is output. In the case of FIG. 8, one sample of the sampling point period is created after five samples of the judgment period. In the case of five samples, four delay blocks 34-1 to 34-$m$ are installed, and five samples of judgment values $Y[n-4]-Y[n]$ are input to the maximum value judgment block 36, and the maximum value Max1 thereof is output from the maximum value judgment block 36.

The sine wave Y of the sine wave generation block 30 is input to the analog waveform maximum value acquisition block 40. The analog waveform maximum value acquisition block 40 acquires the maximum value Max2 of the sine wave Y in the sampling block in FIG. 8.

The maximum value Max1, which is decided at one sample before the maximum value Max2, is delayed by the delay block 38, and is input to the division block 42. The division block 42 determines the ratio Rate (=Max2/Max1) from the absolute value of the maximum value Max1 and the absolute value of the maximum value Max2.

As FIG. 8 shows, sine waves F1(P1)-F1(Pn) with each phase P1-Pn are generated for one frequency F1, the ratio Rate of each phase is calculated at the frequency F1, and the maximum value acquisition block 44 acquires the maximum value Rate Max of the ratio Rate at each phase.

In other words, it is measured in a predetermined judgment period (five samples in the case of FIG. 8) how much the maximum value of the judgment result of the position error by the judgment formula influences the position error (amplitude value) of the subsequent sampling point period. The maximum value Rate (Max) of the ratio at this frequency is measured while changing the frequency of the sine wave (that is position error), as shown in FIG. 8. For example, as sign 'Fn' in FIG. 8 shows, the maximum value Rate (Max) of the ratio at the above mentioned specified frequency is measured while changing the frequency.

The maximum ratio of the amplitude of each frequency acquired like this is stored in the table in FIG. 9. In other words, a table for storing the maximum ratio Rate (Max) at each frequency F (=f1, f2, ..., fn) is acquired.

This measurement can be implemented by execution of a program, which will now be described according to the flow in FIG. 6.

(S10) The setting frequency F is initialized to "dF".

(S12) The setting phase Phase is initialized to "0", and the maximum ratio Rate (max) is initialized to "0".

(S14) The sine wave $Y = \sin(2\pi F + \text{Phase})$ is generated.

(S16) This generated sine wave Y is calculated using the above mentioned judgment formula for the number of samples in the judgment period (5 samples in the case of FIG. 8), and the maximum value Max1 thereof is determined.

(S18) In the same way, the maximum value Max2 of the sampling point period (see FIG. 8) from the judgment period to the next sampling point of the generated sine wave Y is determined.

(S20) The ratio Rate (Phase) of the maximum values Max2 and Max1 at the phase Phase is calculated by Rate (Phase)= abs (Max2/Max1)

(S22) It is judged whether the calculated ratio Rate (Phase) is greater than the maximum ratio RateMax (F) so far at that frequency. If the Rate (Phase) is greater than the maximum ratio RateMax (F), the maximum ratio RateMax (F) is updated to the calculated Rate (Phase).

(S24) Then the setting Phase is updated to (Phase+dPhase) to change the phase.

(S26) It is judged whether the updated setting phase Phase is $2\pi$ or more. If the setting phase Phase is not $2\pi$ or more, the processing returns to step S14.

(S28) If the updated setting phase Phase is $2\pi$ or more, on the other hand, the calculation of the maximum ratio of this setting frequency F ends. And the processing moves to the processing for the next frequency, so the setting frequency F is updated to (F+dF). And it is judged whether the updated setting frequency F is Fs (sampling frequency)/2 or more. If the updated setting frequency F is Fs (sampling frequency)/2 or more, it means that the setting frequency F has reached the Nyquist frequency, and control is impossible, so the processing ends. If the updated setting frequency F is not Fs (sampling frequency)/2 or more, on the other hand, the processing returns to step S12, and the maximum ratio for the next frequency is calculated.

The calculated result is stored in the table, as shown in FIG. 9. Slice of the judgment formula is determined using the maximum amplitude ratio for each frequency with the number of judgment samples in a judgment formula.

Figure 10:
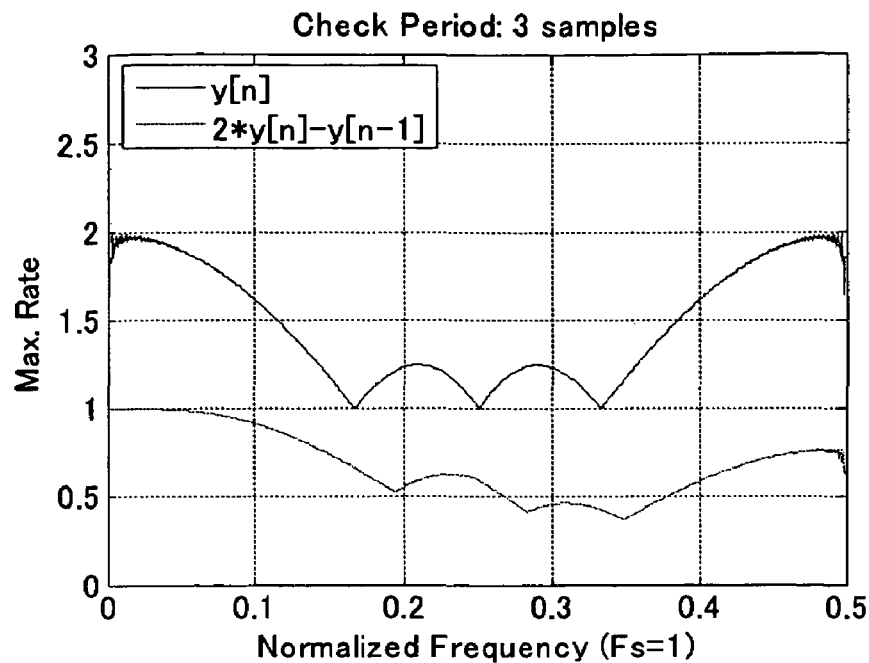
FIG. 10 is a diagram depicting three samples of the judgment period acquired by the maximum ratio calculation for each frequency in FIG. 6.
Figure 11:
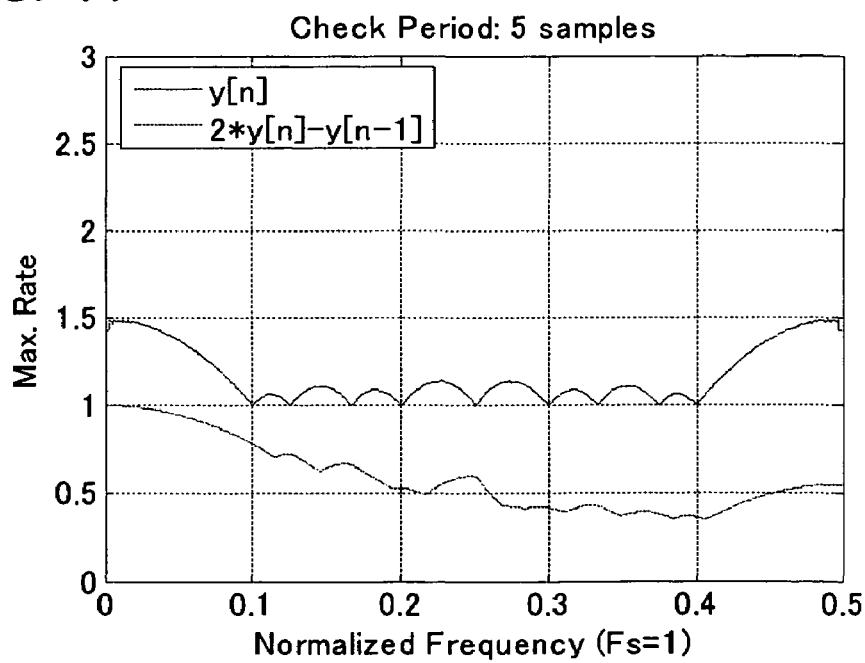
FIG. 11 is a diagram depicting five samples of the judgment period acquired by the maximum ratio calculation for each frequency in FIG. 6.

FIG. 10 is a diagram depicting the relationship of frequency and maximum amplitude ratio MaxRate when the number of judging samples is "3". FIG. 11 is a diagram depicting the relationship of frequency and maximum amplitude ratio MaxRate when the number of judgment samples is "5". The relationships shown here are cases when the judgment formula is y[n] and (2*y[n]−y[n−1]). In FIG. 10 and FIG. 11, the frequency of the abscissa is the normalized frequency regarding the sampling frequency Fs as "1", and only the sampling points are shown.

These diagrams of relationships show that the maximum amplitude ratios are different depending on the frequency when one judgment formula is used, and if a different judgment formula is used, the maximum amplitude ratios also change.

FIG. 12 is a diagram depicting the relationship of frequency and maximum amplitude ratio MaxRate when the number of judging samples is "3", and the difference from FIG. 10 is that the values only at the sampling points are shown in FIG. 10, but the maximum values in the sampling period (see FIG. 7) are shown in FIG. 12. FIG. 13 is a diagram depicting the relationship of frequency and maximum amplitude ratio MaxRate when the number of judgment samples is "5" using the maximum value in the sampling period.

As FIG. 12 and FIG. 13 show, if the judgment formula is y[n], the maximum value of the maximum amplitude ratios is "2", except the area near the Nyquist frequency when the number of judgment samples is "3", the maximum of the maximum amplitude ratios is "1.5" when the five samples are used.

This means that the judgment values, when a certain judgment formula is used, shift 2 times and 1.5 times at the maximum. Therefore if the tolerance width of a settling range is "1", 2 times and 1.5 times of slices at the maximum must be provided. Therefore an optimum slice value can be acquired by dividing the tolerance width by this maximum amplitude ratio.

In the same way, in the case of the judgment formula (2*y[n]−y[n−1]), the maximum of the maximum amplitude ratio is "1", except the area near the Nyquist frequency when the number of judgment samples is "3", and in the same way, the maximum of the maximum amplitude ratio is "1" in the case of five samples.

This will be described with reference to FIG. 14 and FIG. 15. As the example of a magnetic disk in FIG. 14 shows, if the tolerance width provided is ±0.15 of one track width from the track center, then as the table in FIG. 15 shows, the judgment slice value is 0.15/2=0.075 (track) when the number of samples is "3" in the case of judgment formula y[n], and is 0.15/1.5=0.10 (track) when the number of samples is "5".

In the same way, in the case of judgment y[n−1]), the judgment slice value is 0.15/1.0=0.15 (track) when the number of judgment samples is "3", and is 0.15/1.0=0.15 (track) when the number of judgment samples is "5".

The number of samples 3 and the slice value (absolute value) calculated like this are set in the settling judgment block 24 in FIG. 4 according to the above mentioned judgment formula. For example, when the judgment formula to be used in the settling judgment block 24 is y [n], if the number of judgment samples is set to "3", then the slice value is set to 0.15/2=0.075 (track), and in the same way, if the number of judgment samples is set to "5", then the slice value is set to 0.15/1.5=0.10 (track).

In the same way, when the judgment formula to be used in the settling judgment block 24 (2*y[n]−y[n−1]), if the number of judgment samples is set to "3", then the judgment slice value is set to 0.15/1.0=0.15 (track), and in the same way, if the number of judgment samples is set to "5", then the judgment slice value is set to 0.15/1.0=0.15 (track).

In this way, a sine wave is provided as a position error, the maximum value of the position error after the specified sample to the next sample is determined, and the ratio of this maximum value of the position error during this sampling period and the maximum value of the settling judgment formula in the judgment period is determined. The maximum of this ratio is determined at every frequency while changing the phase of the sine wave. And from the maximum of the maximum ratio at each frequency, the slice values of the specified number of samples are determined using the tolerance width, and is set to the settling judgment block 24.

Therefore an optimum number of samples and slice value can be set according to the settling judgment formula, and high-speed and accurate settling judgment can be implemented regardless of the vibration frequency to the target position.

Figures 16, 17:
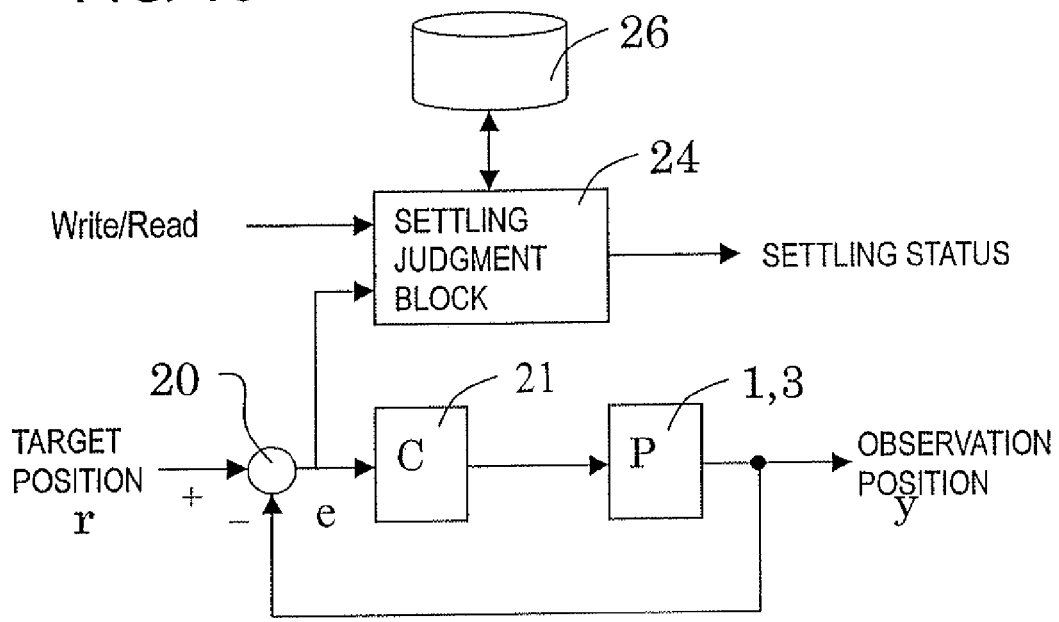
FIG. 16 is a block diagram depicting another positioning control device according to the present invention.
FIG. 17 is a table of the slice values in FIG. 16.

FIG. 16 is a block diagram depicting the operation of the servo control system executed by the MCU 14 in the second embodiment. FIG. 17 is a table 26 thereof. This example shows the setting of the settling judgment conditions when the tolerance width is changed between read and write of the disk. In other words, the tolerance width is wide for read compared to write, since more strict position accuracy is required for write.

As FIG. 16 shows, the servo control system computes the position error e between the target position "r" and the current position "y" by the operation block 20, and performs control operation, calculates the control amount Un, and drives VCMs 1 and 3, which are the plant 22, by the control block (Cn) 21. For the position of the plant, the current position "y" is calculated by demodulating the servo signals from the magnetic head 3, and is fed back to the operation block 20.

The settling judgment block 24 judges settling based on the position error "e" using the settling judgment formula and settling judgment conditions (slice value, number of samples). For the settling judgment formula, either position error e (=Y[n]) itself is used or (2·Y[n]−Y[n−1]) is used. The table 26 is for storing the slice values corresponding to read/write, and setting this data to the settling judgment block 24.

As FIG. 17 shows, when the tolerance width for write is "±0.15" and the tolerance width for read is "0.30", the judgment slice value for write is 0.15/2=0.075 (track) and the judgment slice value for read is 0.150 if the number of judgment samples is "3" in the case of judgment formula y[n], according to FIG. 12 and FIG. 13. And in the same way, in the case when the number of judgment samples is "5", the judgment slice value for write is 0.15/1.5=0.10 (track) and the judgment slice value for read is 0.20.

In the same way, in the case of judgment formula (2*y[n]−y[n−1]), the judgment slice value for write is 0.15/1.0=0.15 (track), and the judgment slice value for read is 0.30 if the number of judgment samples is "3". In the same way, the judgment slice value for write is 0.15/1.0=0.15 (track), and the judgment slice value for read is 0.30 if the number of judgment samples is "5".

In this way, the optimum slice value and number of samples can be set for read/write, and high-speed and accurate settling judgment can be implemented regardless of the vibration frequency to the target position.

Other Embodiments

In the above embodiments, the positioning control device was described using the example of the head positioning device of the magnetic disk device, but the present invention can also be applied to other disk devices, such as an optical disk device, and can also be applied to a positioning control device for an object, other than a disk device. The tolerance width may be other values, and the number of samples may also be another number.

The present invention was described by embodiments, but the present invention can be modified in various ways within the scope of the essential character thereof.

The judgment value of settling judgment and number of continuous judgments are judged by the slice value and number of samples, which are set such that the maximum value of maximum amplitude value, for each frequency of frequency disturbance determined from the maximum amplitude value of the judgment value when the frequency disturbance is applied, is contained within a predetermined positioning accuracy, so settlement can be judged at high-speed and accurately according to the settling judgment formula, and both an improvement of positioning accuracy and high-speed judgment can be implemented.

What is claimed is:

1. A settling judgment method for judging the settling of an object at a target position of a positioning control device for performing position control, according to a position error between a target position and a current position, comprising:
   a step of calculating a judgment value from said position error using a predetermined judgment formula;
   a judgment value judgment step of judging whether said judgment value is less than a slice value, which is set such that each maximum value of maximum amplitude ratios for each frequency of a cyclic disturbance, which are ratios between a maximum value of said cyclic disturbance and the maximum amplitude value of said judgment value for each frequency of a cyclic disturbance measured when said cyclic disturbance is applied to the judgment formula, is contained within a predetermined positioning accuracy; and
   a period judgment step of judging whether a number of samples, of which said judgment value is less than said slice value, continue for a number of samples which is set such that the maximum value of said maximum amplitude ratios is contained within a predetermined positioning accuracy.

2. The settling judgment method for a positioning control device according to claim 1, wherein said judgment value judgment step further comprises a step of judging whether said judgment value is less than the slice value which is set such that the maximum value of said maximum amplitude ratios, for each cyclic disturbance, determined from the maximum amplitude value of said judgment value when a sine wave is applied as a cyclic disturbance is contained within said predetermined positioning accuracy.

3. The settling judgment method for a positioning control device according to claim 1, wherein said judgment value judgment step further comprises a step of judging whether said judgment value is less than the slice value, which is determined from said maximum value of the maximum ratios at a plurality of frequencies and a tolerance width of said positioning accuracy, each maximum ratio being determined between a maximum value of said judgment value of said position error in said settling judgment period and a maximum value of said position error after said judgment period to the next sample while changing the phase of a sine wave as a position error and frequency.

4. The settling judgment method for a positioning control device according to claim 3, wherein said period judgment step further comprises a step of judging settling by continuation of the number of samples, which is determined by said judgment period in which said judgment value is less than said slice value.

5. The settling judgment method for a positioning control device according to claim 1, wherein said judgment value judgment step further comprises a step of judging whether said judgment value is less than one slice value selected from a slice value of the judgment formula, said slice value is determined from said maximum value of said maximum amplitude ratio, for the cyclic disturbance, determined from said maximum amplitude value of said judgment value of a plurality of judgment formulas when the cyclic disturbance is applied,
   and wherein said period judgment step further comprises a step of judging whether the continuous samples of which said judgment value is less than said slice value continue for one of said numbers of samples selected from said numbers of samples of each of said plurality of judgment formulas determined such that the maximum value of said maximum amplitude ratio in said plurality of judgment formulas is contained within said predetermined positioning accuracy.

6. The settling judgment method for a positioning control device according to claim 1, wherein said period judgment step further comprises a step of judging whether the position of a head is settled at said target position of a disk.

7. The settling judgment method for a positioning control device according to claim 6, wherein said judgment value judgment step further comprises a step of judging whether said judgment value is less than either one of a write slice value and a read slice value, said write and read slice value is determined such that the maximum value of said maximum amplitude ratio, for each frequency of cyclic disturbance, determined from the maximum amplitude value of said judgment value when said cyclic disturbance is applied is contained within a predetermined write positioning accuracy or a predetermined read positioning accuracy of said head.

8. A positioning control device, comprising:
   a positioning control block for performing position control of an object according to a position error between a target position and a current position; and
   a settling judgment block which calculates a judgment value from said position error using a predetermined judgment formula, judges whether said judgment value is less than a slice value to judge said settlement, said slice value being determined such that each maximum value of maximum amplitude ratios for each frequency of a cyclic disturbance, which are ratios between a maximum value of said cyclic disturbance and the maximum amplitude value of said judgment value for each frequency of a cyclic disturbance measured when said cyclic disturbance is applied, is contained within a predetermined positioning accuracy,
   wherein said settling judgment block judges whether a number of samples, of which said judgment value is less than said slice value, continue for a number of samples which is set such that the maximum value of said maximum amplitude ratios is contained within said predetermined positioning accuracy.

9. The positioning control device according to claim 8, wherein said settling judgment block judges whether said judgment value is less than said slice value, which is set such that the maximum value of said maximum amplitude ratios for each cyclic disturbance, determined from the maximum amplitude value of said judgment value when a sine wave is applied as a cyclic disturbance, is contained within said predetermined positioning accuracy.

10. The positioning control device according to claim 8, wherein said settling judgment block judges whether said judgment value is less than said slice value, which is determined from said maximum value of said maximum ratios at said plurality of frequencies and a tolerance width of said positioning accuracy, said maximum ratio is determined between said maximum value of said judgment value of said position error in said settling judgment period and a maximum value of said position error after said judgment period to the next sample at said plurality of frequencies while changing a phase of a sine wave as a position error and frequency.

11. The positioning control device according to claim 10, wherein said settling judgment block judges settling by continuation of the number of samples which is determined by said judgment period in which said judgment value is less than said slice value.

12. The positioning control device according to claim 8, wherein said settling judgment block judges whether said judgment value is less than one slice value, selected from a slice value of the judgment formula, said slice value is determined from said maximum value of said maximum amplitude ratio, for the cyclic disturbance, determined from a maximum amplitude value of said judgment value of a plurality of judgment formulas when the cyclic disturbance is applied, and judges whether the continuous samples of which judgment value is less than said slice value continue for one of said numbers of samples selected from said numbers of samples of said plurality of judgment formulas determined such that the maximum value of said maximum amplitude ratio in said plurality of judgment formulas is contained within a said predetermined positioning accuracy.

13. The positioning control device according to claim 8, wherein said positioning control block positions a head, as said object, at said target position of a disk.

14. The positioning control device according to claim 13, wherein said settling judgment block judges whether said head is settled within said positioning accuracy range of said target position.

15. The positioning control device according to claim 8, wherein said settling judgment block judges whether said judgment value is less than either one of a write slice value and a read slice value, said write and read slice value is determined such that each said maximum value of said maximum amplitude ratios, for each frequency of cyclic disturbance, determined from the maximum amplitude value of said judgment value when said cyclic disturbance is applied is, contained within a predetermined write positioning accuracy or a predetermined read positioning accuracy of said head.

16. The positioning control device according to claim 15, wherein said settling judgment block selects said write slice value or read slice value depending on whether said head performs read operation or write operation of said disk.

17. The positioning control device according to claim 13, wherein said settling judgment block judges whether said head is settled at said target position during seek control of said head.

18. The positioning control device according to claim 13, wherein said settling judgment block judges whether said head is following up to said target position.

19. A disk apparatus comprising:
a head for at least reading data on a disk;
an actuator for moving said head over the disk;
a positioning control block for performing position control of said head according to a position error between a target position and a current position; and
a settling judgment block which calculates a judgment value from said position error using a predetermined judgment formula, judges whether said judgment value is less than a slice value to judge said settlement, said slice value being determined such that each maximum value of maximum amplitude ratios for each frequency of a cyclic disturbance, which are ratios between a maximum value of said cyclic disturbance and the maximum amplitude value of said judgment value for each frequency of a cyclic disturbance measured when said cyclic disturbance is applied, is contained within a predetermined positioning accuracy,
wherein said settling judgment block judges whether a number of samples, of which said judgment value is less than said slice value, continue for a number of samples which is set such that the maximum value of said maximum amplitude ratios is contained within said predetermined positioning accuracy.

20. The disk apparatus according to claim 19, wherein said settling judgment block judges whether said judgment value is less than either one of a write slice value and a read slice value, said write and read slice value is determined such that said each maximum value of said maximum amplitude ratios, for each frequency of cyclic disturbance, determined from the maximum amplitude value of said judgment value when a cyclic disturbance is applied is, contained within a predetermined write positioning accuracy or a predetermined read positioning accuracy of said head.

* * * * *